Dec. 10, 1929.   A. A. BROWN   1,739,288
AMPUL
Filed Aug. 30, 1928
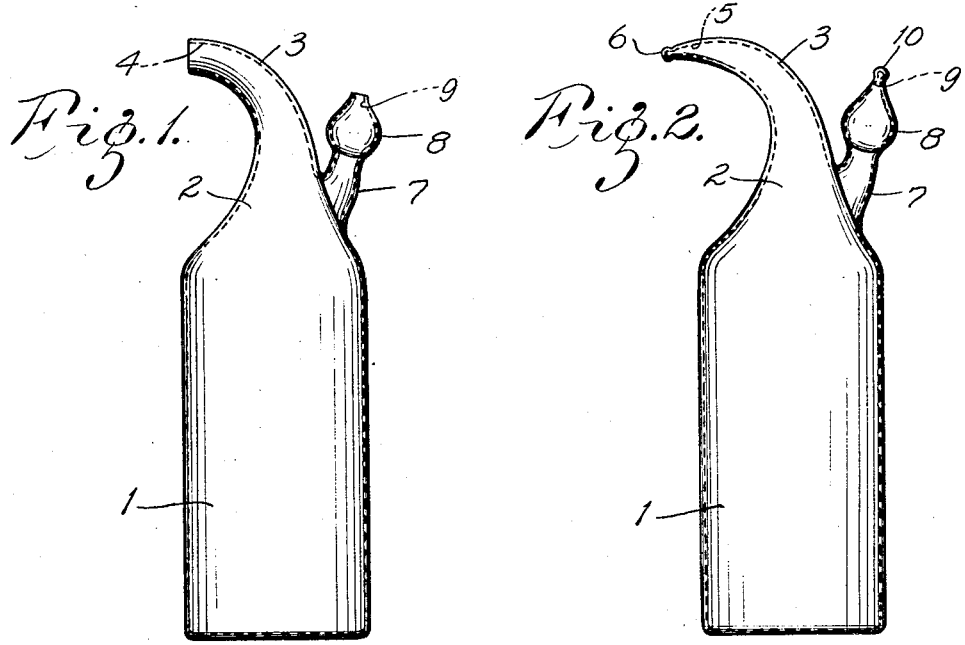
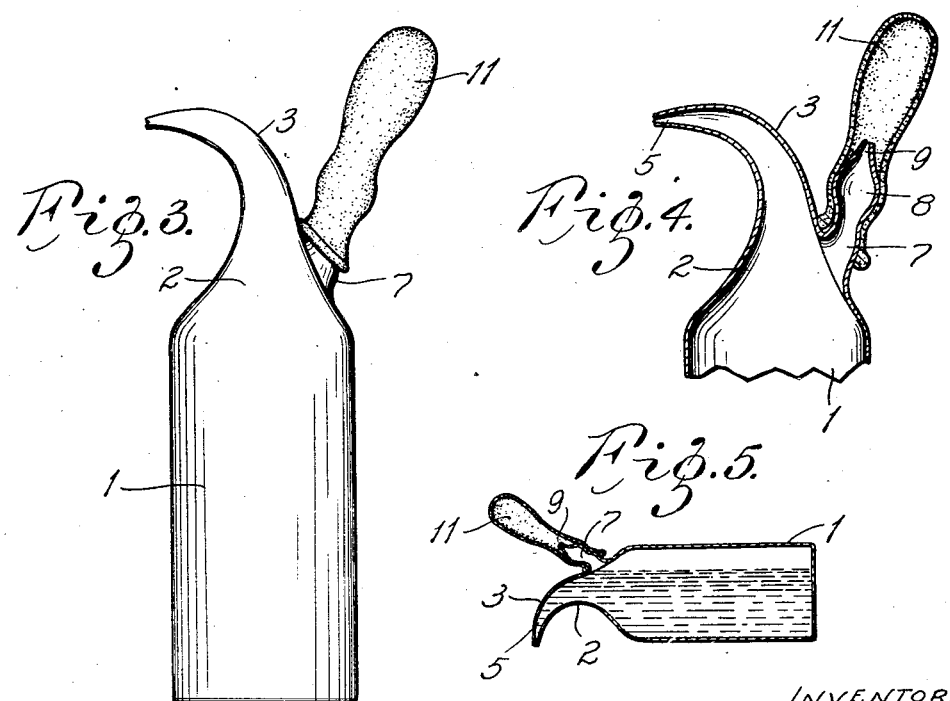
INVENTOR:
Arthur A. Brown
HIS ATTORNEYS.

Patented Dec. 10, 1929

1,739,288

UNITED STATES PATENT OFFICE

ARTHUR A. BROWN, OF ST. LOUIS, MISSOURI

AMPUL

Application filed August 30, 1928. Serial No. 303,072.

My invention relates to a container for shipping, keeping and dispensing in small quantities liquids that are liable to react upon cork or rubber stoppers or require special precaution against contamination. Its principal objects are to provide for the filling and hermetic sealing of the container until it reaches the consumer, to adapt such container for use as a dispensing dropper, and to provide for maintaining the purity of the liquid after the container is opened and until the container is exhausted. The invention consists principally in providing the top of a flat-bottomed glass ampul with an elongated tubular projection designed to become a nozzle and also with a tubular projection adapted for engagement by a rubber bulb, the tips of said projections being sealed by fusion after the container is filled, leaving the fused portions in condition to be readily broken off and thereby open bores of capillary size.

In the accompanying drawing, which forms part of this specification and wherein like reference numerals refer to like parts wherever they occur, Fig. 1 is a side view of my container prior to sealing;

Fig. 2 is a similar view thereof after filling and sealing;

Fig. 3 is a similar view of the device after the sealed tips are broken off and a rubber bulb is supplied to one of them;

Fig. 4 is a vertical sectional view corresponding to Fig. 3; and

Fig. 5 is a sectional view in position for use as a dropper.

My container is made of glass or similar material. The body 1 thereof is bottle-shaped of any suitable cross-section and has a flat or concave bottom upon which it may rest in an upright position. The upper end 2 of the container tapers and has an elongated tubular prolongation 3 with a bore 4 of sufficient size to permit filling of the container, said prolongation being preferably curved sideways. After the bottle is filled, the tip portion of this prolongation is fused, drawn out and sealed, thereby forming a bore 5 of capillary size that is hermetically sealed and adapting the tip 6 to be easily broken off when desired. For this purpose, the glass may be scored or otherwise weakened to determine the line of fracture.

At the shoulder of the container is a second tubular projection 7 which has a bulbular enlargement 8 and terminates with a bore 9 of capillary size. After the bottle is filled, the tip portion 10 of this second tubular projection is sealed by fusing the glass; and this fused tip also is adapted to be easily broken off close to the bulbular enlargement, leaving an opening of capillary size in the end. The bulbular enlargement is adapted to be engaged by an ordinary rubber bulb 11. Preferably the ends of both tubular projections lie substantially flush with opposite sides of the body portion to avoid danger of breakage in packing and shipping and to facilitate use in dispensing.

In practice, the device is used as follows: The container is readily filled at the laboratory and the tips of both of the tubular projections are then sealed by fusing the glass. The liquid in the sealed container remains entirely free from contact with any other substance than glass. When the package reaches the consumer, the sealed tips are broken off and a rubber bulb applied to the shorter tubular projection, thereby converting the device into a dispensing dropper. When it is desired to dispense one or more drops of the liquid, the device is tilted over with its nozzle downward, and the rubber bulb is compressed to increase the pressure on the liquid and force the liquid drop by drop through the capillary nozzle, after which the bottle is placed in an upright position until it is to be used again. The liquid is thus kept and fully dispensed in the same container in which it left the laboratory and is always fully protected from contact with organic matter and other foreign substances. The device is especially valuable with liquids which are very sensitive and easily contaminated by contact with organic matter and especially with such liquids as are administered drop by drop.

What I claim is:

1. A glass ampul having at its top an elongated tubular projection with the end portion of its bore of capillary size and adapted to constitute a dropper nozzle, and having at its upper portion a second tubular projection adapted for engagement by a rubber bulb, said second projection having no outer opening of capillary size inside of said bulb.

2. A flat bottom glass ampul having at its top an elongated curved tubular projection constituting a dropper nozzle with the bore of its end portion of capillary size and having at its upper portion a second tubular projection with an enlargement adapted to be engaged by a rubber bulb, the tip portions of said tubular projections being fused to seal the same and being adapted to be easily broken off.

3. A glass ampul with a tapering top portion and an elongated curved tubular prolongation thereof constituting a dropper nozzle with the tip portion of its bore of capillary size, and having a tubular projection from said tapering portion adapted for engagement by a rubber bulb, the ends of both of said projections being nearly in line with the opposite sides of the body portion respectively.

4. A flat bottom glass ampul having at its top an elongated curved tubular projection integral therewith and constituting a dropper nozzle with a bore of capillary size and also having at its upper portion a second tubular projection integral therewith with an outer opening of capillary size, and a rubber bulb mounted on said last mentioned tubular projection.

Signed at St. Louis, Missouri, this 28th day of August, 1928.

ARTHUR A. BROWN.

CERTIFICATE OF CORRECTION.

Patent No. 1,739,288.                  Granted December 10, 1929, to

ARTHUR A. BROWN.

It is hereby certified that error appears in the printed specification of the above numbered patent requiring correction as follows: Page 2, line 4, claim 1, for the word "no" read "an"; and that the said Letters Patent should be read with this correction therein that the same may conform to the record of the case in the Patent Office.

Signed and sealed this 28th day of January, A. D. 1930.

(Seal)                                                     M. J. Moore,
                                                        Acting Commissioner of Patents.